UNITED STATES PATENT OFFICE.

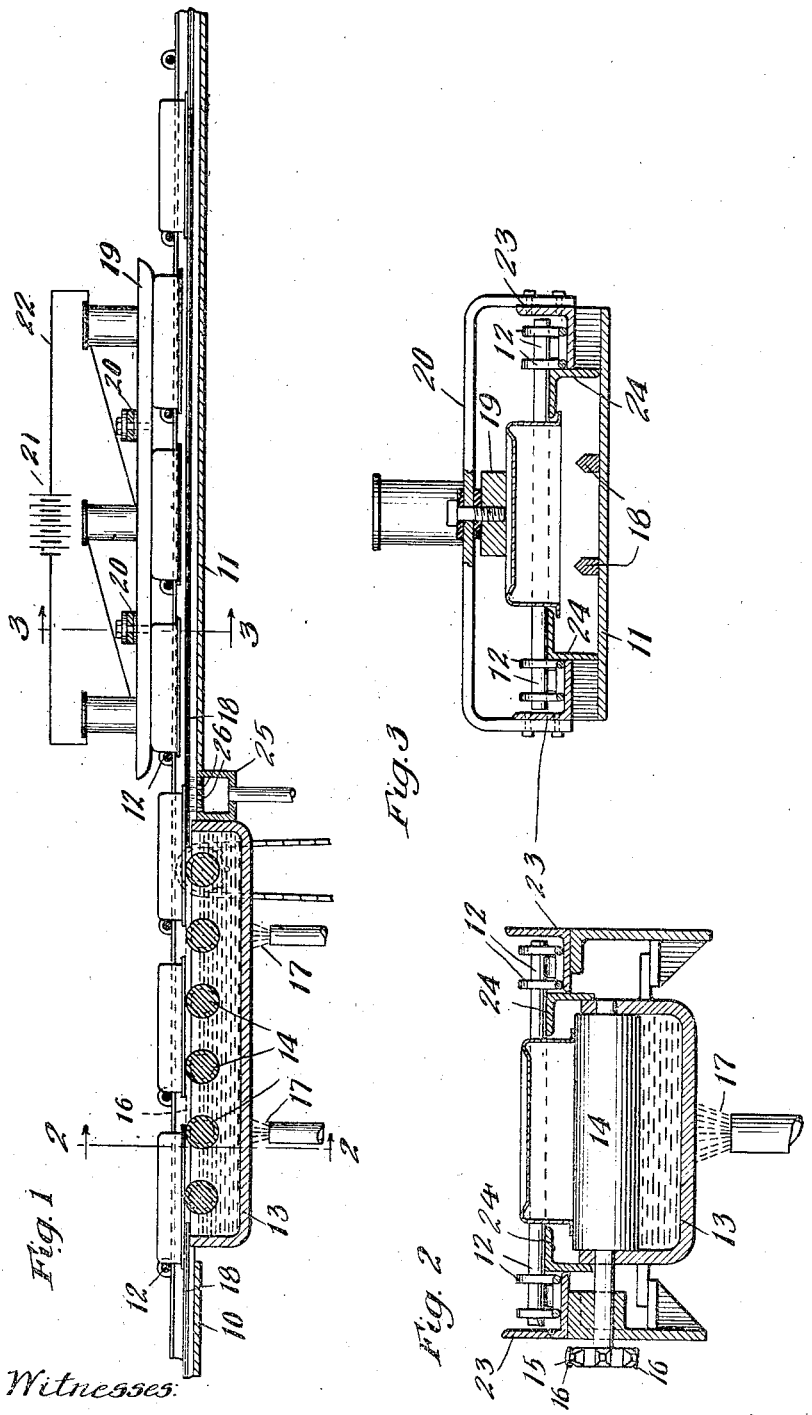

WILLIAM E. TAYLOR, OF EASTPORT, MAINE, ASSIGNOR TO AMERICAN CAN COMPANY, OF NEW YORK, N. Y., A CORPORATION OF NEW JERSEY.

SOLDER-APPLYING MACHINE.

1,200,272.  Specification of Letters Patent.  Patented Oct. 3, 1916.

Application filed November 17, 1911. Serial No. 660,613.

*To all whom it may concern:*

Be it known that I, WILLIAM E. TAYLOR, a citizen of the United States, residing in Eastport, in the county of Washington and State of Maine, have invented a new and useful Improvement in Solder-Applying Machines, of which the following is a specification.

This invention relates to solder applying machines.

Heretofore in machines for applying solder to the flanges of can bodies, and more particularly those adapted for applying solder to the flanges of rectangular sardine can bodies, it has been customary to pass the can bodies in an inverted position over a series of rollers revolving in a solder bath, the cans being propelled by means of a conveyer, and then after the can bodies have passed over the rollers, to run them over tracks having sharp or knife edges, until the solder has cooled and set.

I am aware of the patent to S. A. Baker No. 906,603 dated December 15, 1908, according to which solder is applied to the bottom flanges of can bodies, the bottom being afterward soldered to said flanges, in which solder applying operation the can bodies are supported on rails by their top flanges.

In canning sardines where solder seams are employed, difficulty is often experienced in applying covers to can bodies in obtaining a hermetically tight joint, due to minute pin holes or blow holes being formed during the fusing of the solder seam, and by experiment I have found that this defect is oftentimes due to the uneven application of solder to the solder flange, and that this uneven application results from the solder being in contact with the tracks or table over which the bodies are passed while the solder is setting, these tracks sometimes causing grooves to be left in the solder coating, and other times forming a bead or drop on the flange, and sometimes both of these defects are present.

The object of my invention is to overcome these defects by allowing the solder coating to cool while out of contact with any surface, and thus forming an even layer of solder on the seam flanges, and my invention consists in the mechanism for carrying out these steps, the structure which I have shown comprising a roller solder applying device, an endless can body conveyer, a flame for reducing or simmering down lumps or beads on the flange and located adjacent the tinning rolls, tracks over which the can bodies are adapted to be moved by the conveyer, and a magnetized bar disposed over the tracks adjacent to the flame and along which the can bodies are moved by the conveyer, and which is adapted to raise the can bodies off of the tracks before the solder has had time to cool or set, and to keep the can bodies in such raised position until the solder has properly hardened and a uniform coating has been formed, after which the bodies are allowed to drop back onto the tracks or table.

My invention consists in the improvements in the parts and devices and in the novel combinations of parts and devices herein shown, described and claimed.

In the drawings forming a part of this specification, Figure 1 is a vertical section, showing my improved soldering machine. Fig. 2 is a transverse vertical section, taken substantially on the line 2—2 of Fig. 1. Fig. 3 is a transverse vertical section, taken on the line 3—3 of Fig. 1.

In the drawings, two separated tables 10 and 11 are shown over which the can body conveyer 12, which may be of any suitable construction, preferably of the endless type, is adapted to operate. Between the tables 10 and 11 is disposed the solder tank 13 in which is adapted to rotate a plurality of rollers 14, at least one of said rollers 14 being preferably positively driven as by means of a gear 15, and a sprocket chain 16 driven from any suitable source of power, not shown. The solder is melted by any suitable means, such as gas flames, as indicated at 17. The can bodies are moved along the table and over the rollers 14 in an inverted position, by means of the conveyer 12 in a well known manner, and after passing over the rollers 14 are moved onto knife edge tracks 18 extending along the table 11.

Located adjacent the solder tank 13 and tinning rolls 14, and just below the knife edge tracks 18, is a burner 25, preferably in the form of a square or rectangular box having perforations 26 in the top thereof, through which small jets of flame pass and blaze against the flanges of the cans as they leave the tinning rolls. By this means, any lumps of solder on the flanges are simmered down and spread out, thereby causing an even coating of solder, and at the same time, the jets of flame have a tendency to spread the solder to those portions of the flange which may not have been properly tinned by the rollers. Other forms of burners may be used than that which I have shown.

Disposed above the tracks 18 and in close proximity to the gas flame is a magnetized bar 19, which may be either of the permanent or electro-magnet type, that which I have shown being of the latter form. The magnetized bar 19 is supported as by means of cross bars 20 rigidly attached to the table 11. The bar 19 is disposed parallel to the tracks 18 and spaced therefrom a distance slightly greater than the depth of the can bodies or other articles being soldered, thereby raising the cans slightly from the tracks 18, and the length of the magnetized bar is such that the solder on the lower flanges of the cans has ample time to cool and set before the can bodies pass from beneath the bar.

21 and 22 denote, respectively, in diagrammatic form, the battery and electric circuits for energizing the electro-magnets.

The endless conveyer 12 is also preferably supported on tracks 23 extending alongside the solder tank 13, and to prevent the can bodies from becoming displaced laterally, I also provide guiding rails 24 extending both over the solder applying rollers and the table 11.

Any suitable means may be employed for applying the solder to the can bodies while they are in an inverted position, and it will of course be obvious that my invention is not limited to applying solder to can bodies, but may also be used to apply solder to cover flanges by using a suitable conveyer.

It will be obvious that many changes in the details of my invention may be made without departing from the spirit of the invention, and all such changes are contemplated as fairly come within the scope of the appended claim.

I claim:—

In a machine for applying molten solder to the outturned flanges of drawn sheet metal sardine cans, in combination: a conveyer for sliding cans horizontally in an inverted position; solder rolls over and in contact with which the bottom faces of said can flanges are carried by the said conveyer; means for containing a bath of molten solder in which said rolls dip, whereby molten solder is deposited on the said flanges; a heating burner in the path of the cans, a flame which is adapted to act on said soldered flanges to cause the flow and even distribution of the said deposit of solder; a magnetic rail along which the bottoms of the cans contact and slide in a suspended position during a period of their travel beyond said burner to enable the cooling and setting of the plastic solder without abrasion or disturbance; and supporting rails underneath the cans and on which they are supported and slid after the applied solder is properly cooled, to which rails they are transferred from said magnetic rails; substantially as specified.

WILLIAM E. TAYLOR.

Witnesses:
WILLIAM J. WILSON,
ELISHA W. PIKE.